(12) United States Patent
O'Hara et al.

(10) Patent No.: US 8,976,039 B2
(45) Date of Patent: Mar. 10, 2015

(54) REMOTE OPERATION AND MONITORING OF MEASUREMENT SYSTEMS AND REMOTE MEASUREMENT DATA PROCESSING

(75) Inventors: Patrick O'Hara, Santa Cruz, CA (US); Qiwei (Alan) Xiao, Fremont, CA (US); David Lavo, Santa Cruz, CA (US)

(73) Assignee: Redfish Instruments, Inc., Santa Cruz, CA (US)

( * ) Notice: Subject to any disclaimer, the term of this patent is extended or adjusted under 35 U.S.C. 154(b) by 622 days.

(21) Appl. No.: 13/329,173

(22) Filed: Dec. 16, 2011

(65) Prior Publication Data

US 2012/0154172 A1 Jun. 21, 2012

Related U.S. Application Data

(60) Provisional application No. 61/424,684, filed on Dec. 20, 2010.

(51) Int. Cl.
*G08B 23/00* (2006.01)
*H04Q 9/00* (2006.01)

(52) U.S. Cl.
CPC .............. *H04Q 9/00* (2013.01); *H04Q 2209/10* (2013.01); *H04Q 2209/43* (2013.01)
USPC ........................ 340/870.02; 340/505; 340/3.1

(58) Field of Classification Search
USPC ............. 340/870.02, 505, 517, 3.1, 3.3, 3.31, 340/10.1
See application file for complete search history.

(56) References Cited

U.S. PATENT DOCUMENTS

| | | | | |
|---|---|---|---|---|
| 6,437,692 | B1 * | 8/2002 | Petite et al. | 340/540 |
| 6,985,087 | B2 * | 1/2006 | Soliman | 340/870.02 |
| 7,075,289 | B2 * | 7/2006 | Chen | 324/142 |
| 8,102,278 | B2 * | 1/2012 | Deck et al. | 340/870.07 |
| 2011/0106279 | A1 * | 5/2011 | Cho et al. | 700/90 |

* cited by examiner

*Primary Examiner* — Toan N Pham
(74) *Attorney, Agent, or Firm* — Carr & Ferrell LLP

(57) ABSTRACT

The present application is directed to systems and methods for operating a measurement system. Various embodiments may comprise a measurement device and a receiving device remote from the measurement device. The measurement device may acquire data corresponding to one or more measurements, convert any analog portion of the data into a digital transmission signal, and transmit the signal. The receiving device may receive the signal, convert the signal into digital data, and display the digital data.

8 Claims, 7 Drawing Sheets

US 8,976,039 B2

REMOTE OPERATION AND MONITORING OF MEASUREMENT SYSTEMS AND REMOTE MEASUREMENT DATA PROCESSING

CROSS-REFERENCE TO RELATED APPLICATION

This application is related to and claims the priority benefit of U.S. provisional application No. 61/424,684, filed Dec. 20, 2010 and titled Attachment of Electronic Instruments to Smart Phones and Tablet Computers. The disclosure of the aforementioned application is incorporated herein by reference.

FIELD OF THE INVENTION

The present disclosure is directed generally to measurement devices, and more specifically to remote operation and monitoring of the measurement device.

BACKGROUND

Electrical measurement devices may comprise any instrument that acquires data related to a measured parameter, such as voltage, current, resistance, distance, speed, volume, pressure, flow, and the like. These measurements may be viewed and analyzed in the time or frequency domain, or the measurements may be static. For a measurement device such as a multimeter, the measurements may be taken over a specified bandwidth and reported as a root mean square (RMS) voltage, current, or resistance measurement. The multimeter may include a display screen for visually presenting measurement data. For many applications, it may be advantageous to store, analyze, and share the measurement data.

SUMMARY

The present application is directed to measurement systems and methods for operating a measurement system. Various embodiments may comprise a measurement device and a receiving device remote from the measurement device. The measurement device may comprise a data acquisition component that is configured to acquire data corresponding to one or more measurements. Any analog portion of the data is converted into digital data. A processor may be configured to receive the digital data from the data acquisition component and process the digital data into a communications signal. The measurement device may further comprise a communications component adapted to transmit the signal. The receiving device may comprise a transceiver to receive the signal, and a second processor to convert the signal into digital data. The receiving device may also comprise a display unit to display the digital data.

DETAILED DESCRIPTION

The present application is directed to measurement systems and methods for operating a measurement system. Various embodiments may comprise a measurement device and a receiving device remote from the measurement device. The measurement device may comprise a data acquisition component that is configured to acquire data corresponding to one or more measurements. Any analog portion of the data is converted into digital data. A processor may be configured to receive the digital data from the data acquisition component and process the digital data into a communications signal. The measurement device may further comprise a communications component adapted to transmit the signal. The receiving device may comprise a transceiver to receive the signal, and a second processor to convert the signal into digital data. The receiving device may also comprise a display unit to display the digital data.

Figure 1:
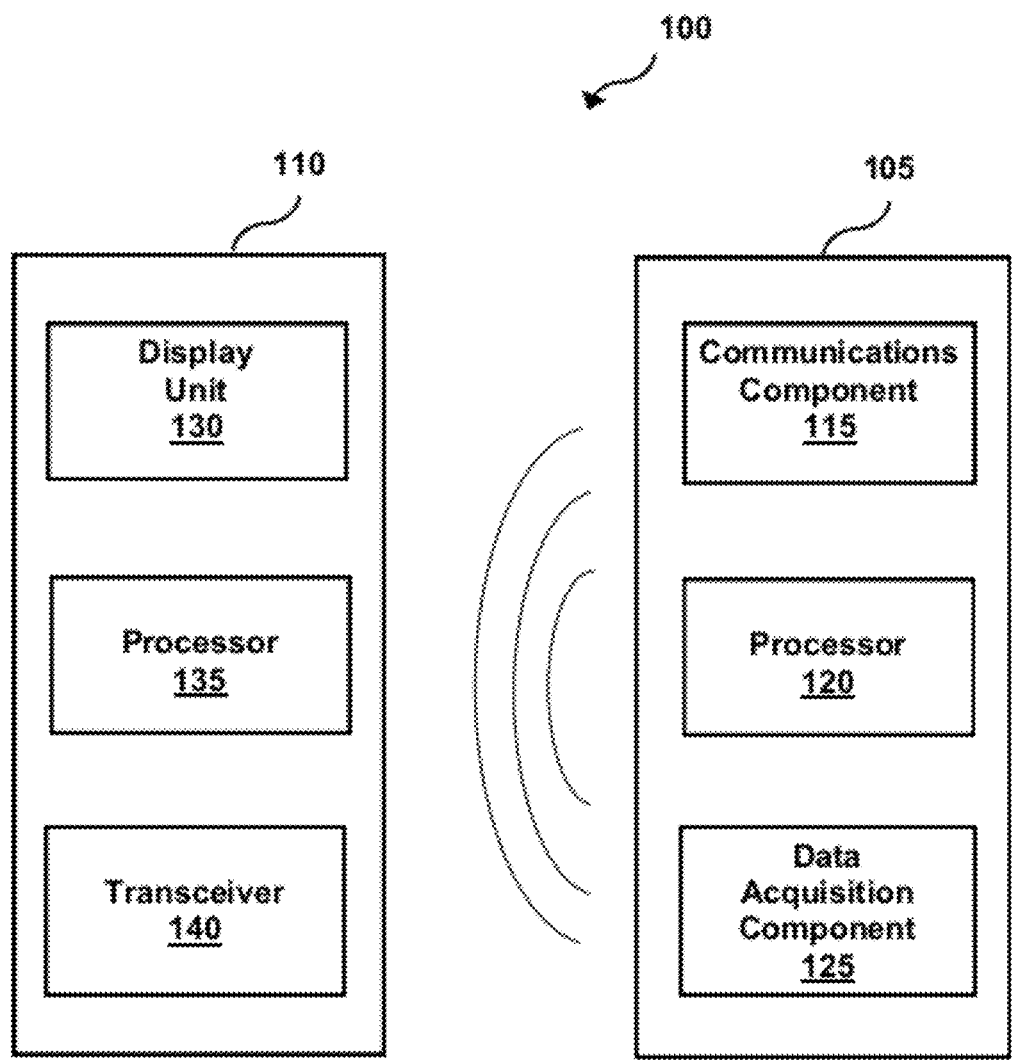
FIG. 1 is a schematic diagram of a measurement system.

FIG. 1 schematically illustrates a measurement system 100, generally comprising a measurement device 105 and a receiving device 110. The measurement device 105 may be any type of electronic measuring device. For example, the measurement device 105 may be a multimeter (or a device that performs a subset of the operations of a multimeter, such as a voltmeter or ammeter), a thermometer, a laser distance measuring tool, oscilloscope, EMF meter, digital pattern generator, pressure transducer, and the like. In various embodiments, the measurement device 105 may generate data, either analog or digital, representing the parameter being measured. For example, the measurement device 105 may produce an analog signal in the form of a direct current (DC) voltage. The DC voltage may be limited to a predetermined range, such as 0-5 volts, and the voltage registered by the measurement device 105 may be proportional to the parameter being monitored.

The measurement device 105 in various embodiments may comprise a data acquisition component 125. The data acquisition component 125 may receive the data during a measurement event. The measurement event may be a single measurement, such as an instantaneous measurement of the current being drawn by a motor. In other embodiments, the measurement event may occur over a period of time, such as the measurement of voltage fluctuations in response to a changing load on a motor.

The data acquisition component 125 may further comprise an analog to digital converter to convert the analog data into digital data. The digital data may then be directed to a processor 120, such as a digital signal processor, that converts the digital data into a communication signal. The processor 120 may be programmed to generate a signal that is compatible with the wave form, frequency, and data packet requirements of any selected communication technology. A communications component 115 may then transmit the signal. In various embodiments, the communications component 115 may comprise a transceiver 140 that allows the measurement device 105 to both transmit and receive signals.

Various embodiments of the receiving device 110 may comprise a transceiver 140 to receive the signal transmitted by the communications component 115 of the measurement device 105. A second processor 135 may convert the signal into digital data, such that the data may be visually displayed on a display unit 130.

Figure 2:
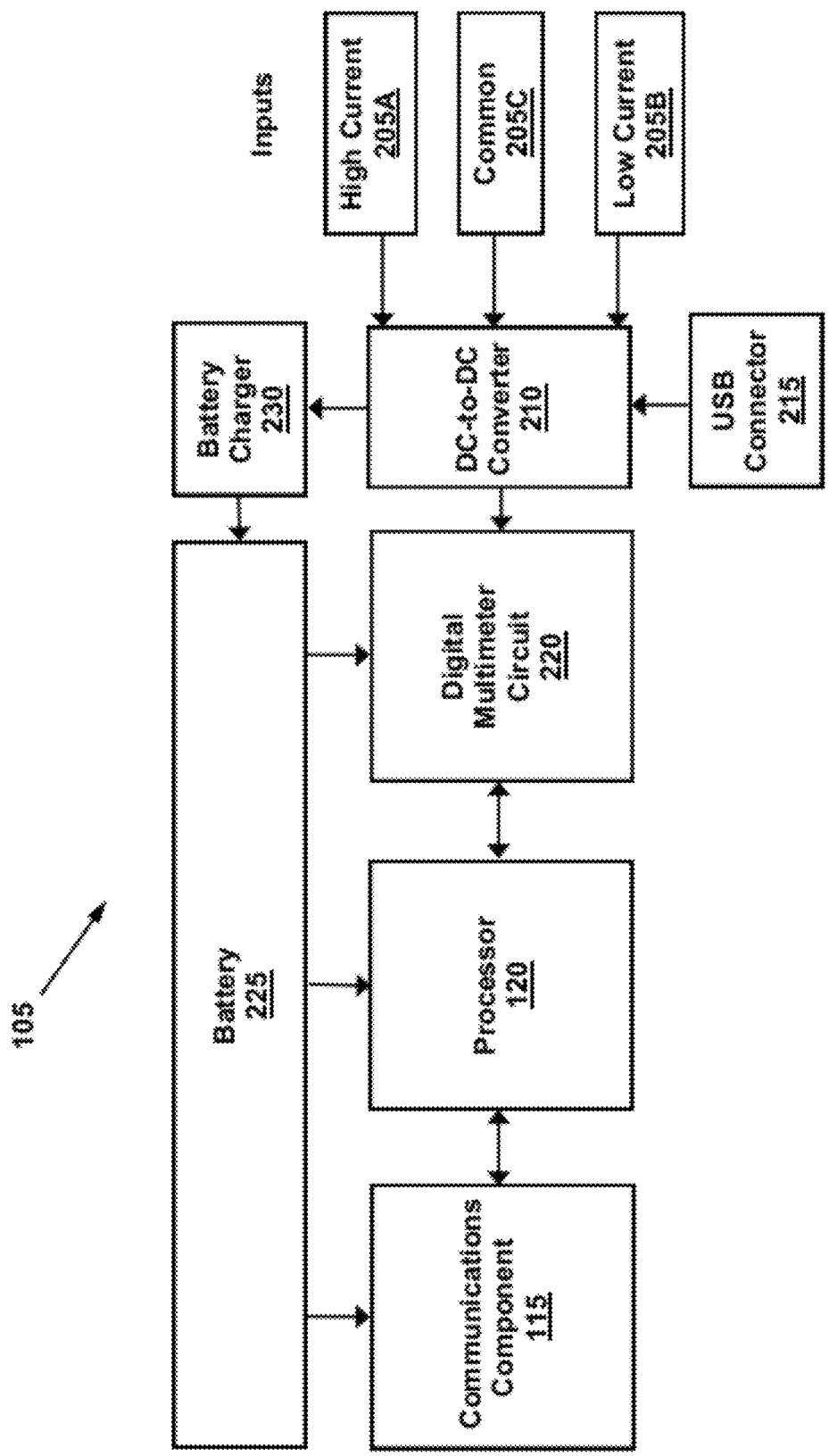
FIG. 2 is a schematic diagram of a measurement device.

FIG. 2 illustrates a schematic diagram of the measurement device 105 according to various embodiments. The measurement device 105 may include fused inputs 205A-205C. A variety of probes (not shown) may be connected to the inputs 205A-205C, depending on the particular measurement application. For example, the probes may comprise an electrically conductive wire with a connector on one end of the wire suitable for interfacing with the inputs 205A-205C and a clamp on the other end suitable for connecting to an electrical component.

Input 205C may be a common input electrically connected to ground. Input 205A may be utilized when the input is connected to a circuit having an amperage above a specified amount, and input 205B may be used when the circuit has an amperage below the specified amount. In various embodiments, the measurement device 105 may comprise a DC-to-DC converter 210 to meet the safety requirements of International Electrotechnical Commission (IEC) Standard IEC/EN61010-1 that specifies general safety requirements for electrical test and measurement equipment. The DC-to-DC converter 210 may serve to effectively electrically isolate the high voltage input 205A from a low voltage shield of the universal serial bus (USB) connector. In general, the IEC standard requires that certain creepage and clearance distance be observed to ensure safe operation.

The various embodiments of FIG. 2 may include a digital multimeter circuit 220 when the measurement device 105 is to function as a multimeter. The digital multimeter circuit 220 may allow user selectable functionality such that a single measurement device 105 may function to measure voltage, current, or resistance (among others), as desired. In various embodiments, the digital multimeter circuit 220 may output a digital data stream to the processor 120.

The processor 120 may employ a 32-bit reduced instruction set computer (RISC) architecture, such as an ARM7 processor. The ARM7 processor is commonly used on mobile devices and has the ability to manage communications, acquire data, monitor battery function, and other functionality of the measurement device 105.

The processor 120 may communicate with the communications component 115 through a universal asynchronous receiver/transmitter (UART) port that serves to translate data between parallel and serial forms. In various embodiments, the communications component 115 may establish a wireless fidelity (WiFi) connection with the receiving device 110 to allow radio frequency communication between the devices 105, 110. The WiFi connection may operate according to the Institute of Electrical and Electronics Engineers (IEEE) 802.11 family of standards. In various embodiments, the communications component 115 may comprise a WiFi 802.11 module with an on-board IP stack that may allow the measurement device 105 to establish itself as a WiFi access point (hot-spot). The receiving device 110 may connect to the measurement device 105 via a traditional ad-hoc WiFi pairing (direct device-to-device connection), eliminating the need for a network connection.

In various other embodiments, an Internet network connection or a cellular telephone connection may be establish to allow communications between the measurement device 105 and the receiving device 110, particularly when the devices 105, 110 are out of range of the WiFi connection. Various embodiments may instead rely on other communication methods, such as Bluetooth, Zigbee, Wimax, infrared, and the like. Various embodiments may comprise a single communications method, while other embodiments may comprise more than one method. Selection of which communications method to use may occur automatically or may be selected by a user. An exemplary range of the device is 150 meters, although practical considerations may limit the effective range to perhaps 30 meters.

The measurement device 105 may also include a battery 225 to provide power for the operation of the various components. As illustrated in FIG. 2, the battery 225 may be a rechargeable battery, such as a lithium ion battery or other rechargeable battery as known in the art. Power to recharge the battery 225 may be supplied through the USB connector 215. Electrical power may be routed through a battery charger 230 that monitors the state of charge on the battery 225 and supplies electrical current to recharge the battery 225 when the charge drops below a predetermined amount. In various embodiments, a non-rechargeable battery 225 may be used, while in other embodiments no battery 225 is used and power is supplied directly from an outside source (such as through the USB connector 215).

Figure 3:
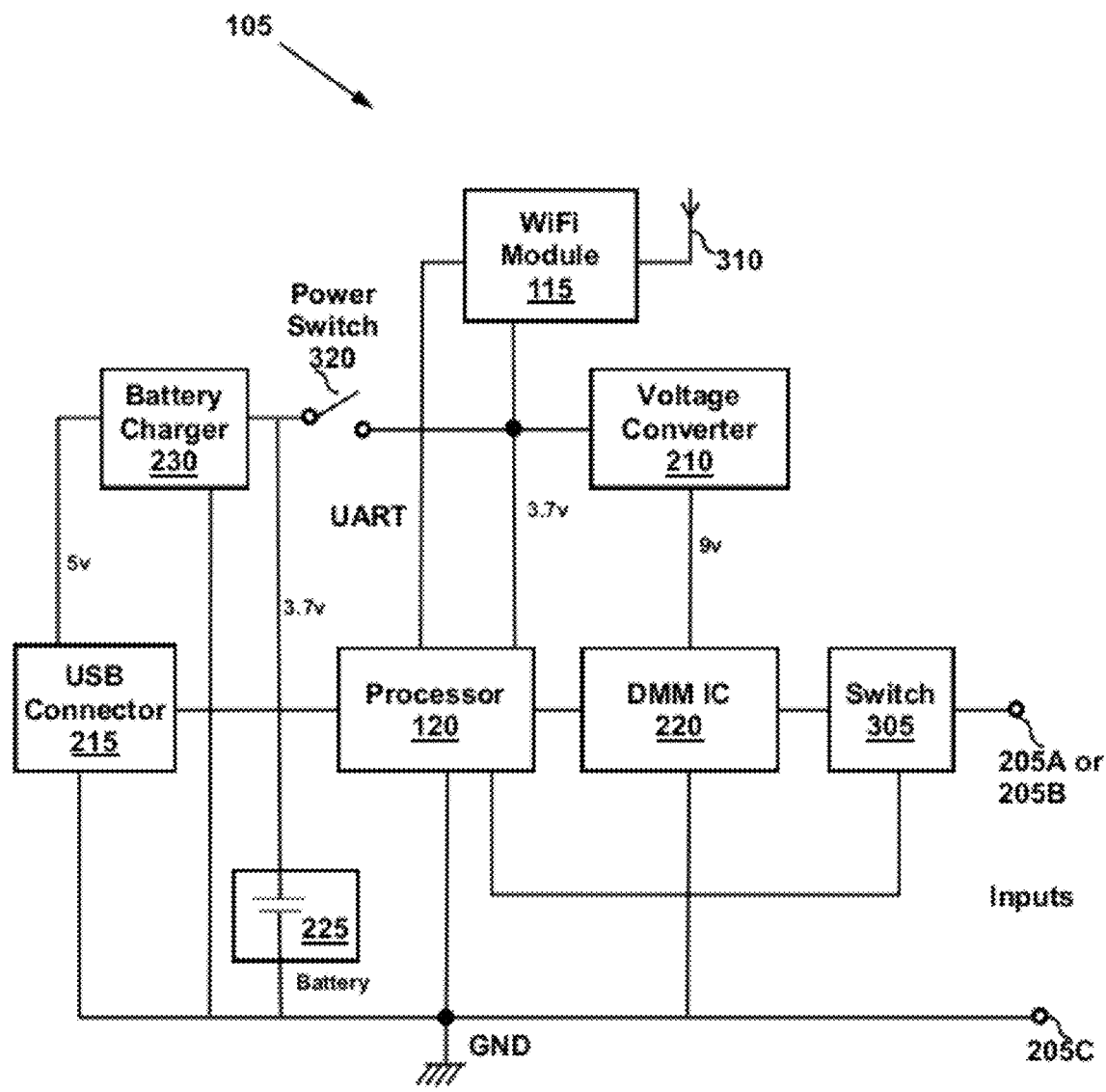
FIG. 3 is a schematic circuit diagram of a measurement device.

FIG. 3 is a schematic circuit diagram of an exemplary measurement device 105. The inputs may comprise high current input 205A or low current input 205B, along with ground input 205C. Input 205A or 205B may be controlled by a switch 305 operatively coupled to the processor 120. The switch 305 may function to electrically isolate the input 205A, 205B. The switch 305 may also function to direct the input 205A, 205B to one of a variety of ports on the digital multimeter circuit 220. For example, if the measurement device 105 is functioning as a voltmeter, then the input 205A, 205B may be directed to one port, while the input 205A, 205B may be directed to another port if the measurement device 105 is functioning as a ohmmeter. As described previously, the voltage converter 210 serves to lower the voltage of high voltage inputs for safety considerations. The digital output signal from the digital multimeter circuit 220 may be directed to the processor 120, which may in turn convert the digital signal into a communications signal. The communications signal may be directed to the WiFi module 115 via the UART. The WiFi module 115 may be equipped with an antenna 310 to assist reception and transmission. The power switch 320 is a switch which selectively electrically couples and uncouples electrical power from battery 225 and/or USB connector 215 to the rest of the electrical circuit.

During the manufacturing process of the measurement device 105, the communications component 115 may be provisioned to pair effectively with certain smartphones or tablet computers. The provisioning may occur via a serial communications link prior to coupling the communications component 115 to the processor 120. The communications component 115 may be provisioned for an ad-hoc mode with the network service set identifier (SSID) being, for example, DMM-xx-yy, where xx and yy may be the last 4 bytes of its media access control (MAC) address so each measurement device 105 may essentially have a unique SSID. The IP address of the communications component 115 may be a fixed value. Once the communications component 115 is powered up, it may be in data (transparent) mode. A user may then access a selected wireless network.

Measurement devices 105 that have substantial speed and bandwidth requirements may require on-board buffering. The processor 120 may be configured with sufficient memory to allow bursting of data to the receiving device 110. However, when measurements are taken over an extended period of time, separate memory from that on-board the processor 120 may be required. Although not shown in FIG. 1, both the measurement device 105 and the receiving device 110 may comprise memory to store measurement data.

The receiving device 110 may be equipped with software or firmware that allows a user to input commands via a graphical user interface projected on the display unit 130. The commands may be transmitted by the transceiver 140 to the measurement device 105. The commands may be received by the processor 120, and the processor 120 may affect the operation of the measurement device 105 according to the commands received. Thus, the user may remotely manipulate the measurement device 105 by entering commands via the receiving device 110. For example, the user may change the measurement range of the measurement device 105 from 0-5 volts DC to 0-50 volts DC by entering appropriate commands via the receiving device 110.

The second processor 135 of the receiving device 110 may be adapted to perform a variety of analyses of the measurement data. For example, the minimum, maximum, average, variance, standard deviation, and the like may be calculated for a given data set. In addition, the capture of data allows for sharing of the data, data logging, graphical presentation of the data, and verification of equipment operating parameters.

Figure 4:
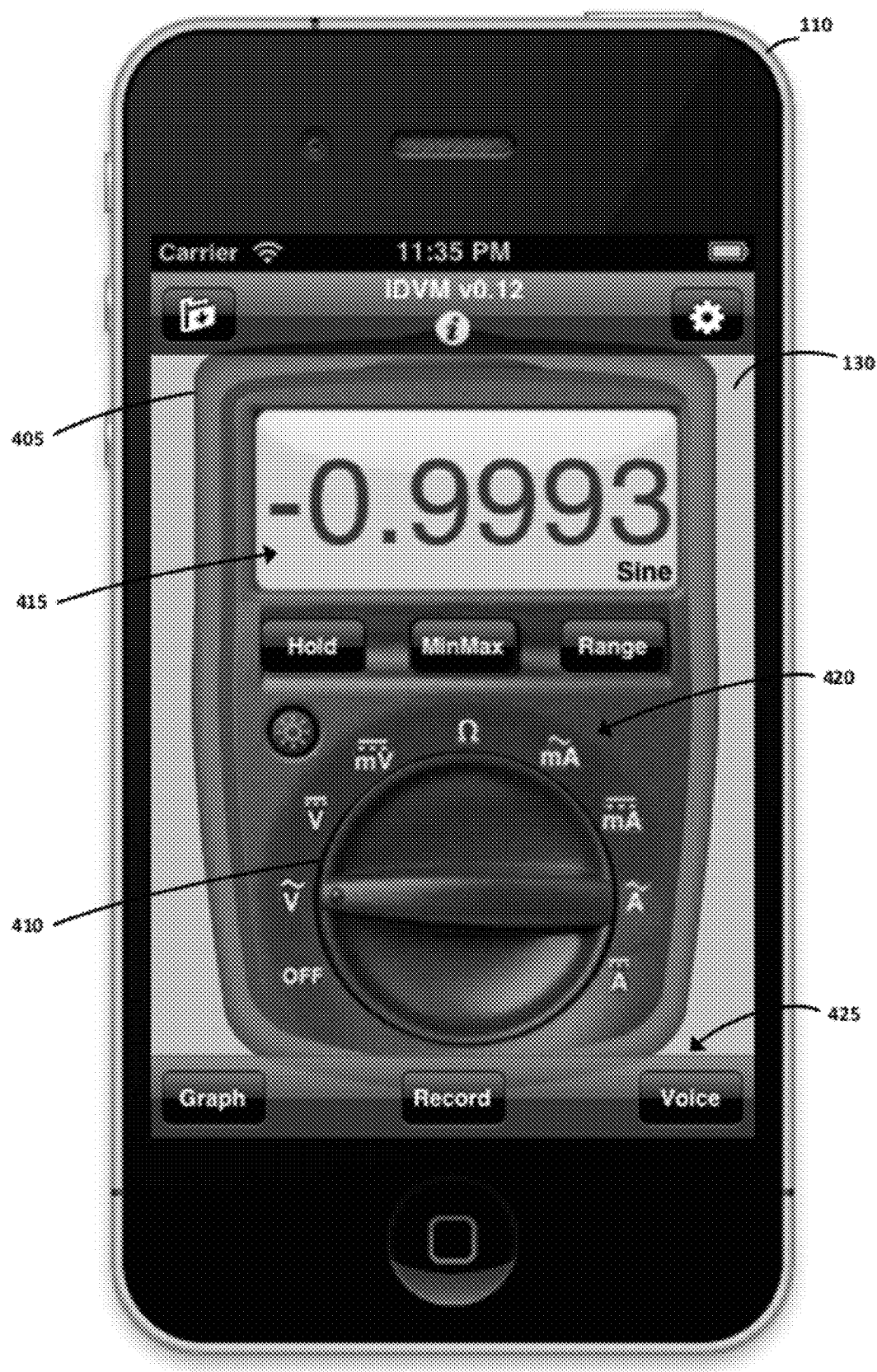
FIG. 4 illustrates a display of the receiving device.

Various embodiments of the receiving device 110 are illustrated in FIG. 4. The receiving device 110 may be a handheld device, such as a tablet computer or smartphone. As described above, the receiving device 110 may comprise a display unit 130, such as a light emitting diode (LED) display, organic light emitting diode (OLED), active matrix organic light emitting diode (AMOLED), liquid crystal display (LCD), plasma display, electronic paper display, and the like. A digital representation 405 of the measurement device 105 may be projected on the display unit 130. As shown in FIG. 4, the digital representation 405 may comprise a multimeter. The digital representation 405 may be visually similar to a conventional multimeter, which may facilitate a familiar user experience. The multimeter digital representation 405 may comprise a rotary switch 410 that may be moved to a variety of positions indicated by symbols 420 to select a particular function. For example, the rotary switch 410 in FIG. 4 is positioned to measure alternating current voltage.

In various embodiments, the display unit 130 may be touch sensitive, allowing a user to adjust the digital representation 405 or change settings on the multimeter by touching the display unit. For example, the user may change the rotary switch 410 setting by touching the rotary switch 410 and rotating the image to the desired setting. In other embodiments, the receiving device may recognize voice commands, allowing settings and other features to be manipulated through voice commands.

The digital representation 405 may also comprise a digital readout 415 to display a value of a measured parameter. The digital readout 415 may also display a variety of settings, functional information, and other measurements. Various embodiments may also produce an audible output of the measurement or other information displayed on the digital readout 415.

The display unit 130 may also project a command bar 425 to provide convenient access to certain functions. As illustrated in FIG. 4, the command bar 425 provides one button access to a graphing mode, a recording mode, and a voice mode. Other command bars 425 may be accessible by the user, and may either be pre-programmed into the receiving device 110, or customizable by the user.

Figure 5:
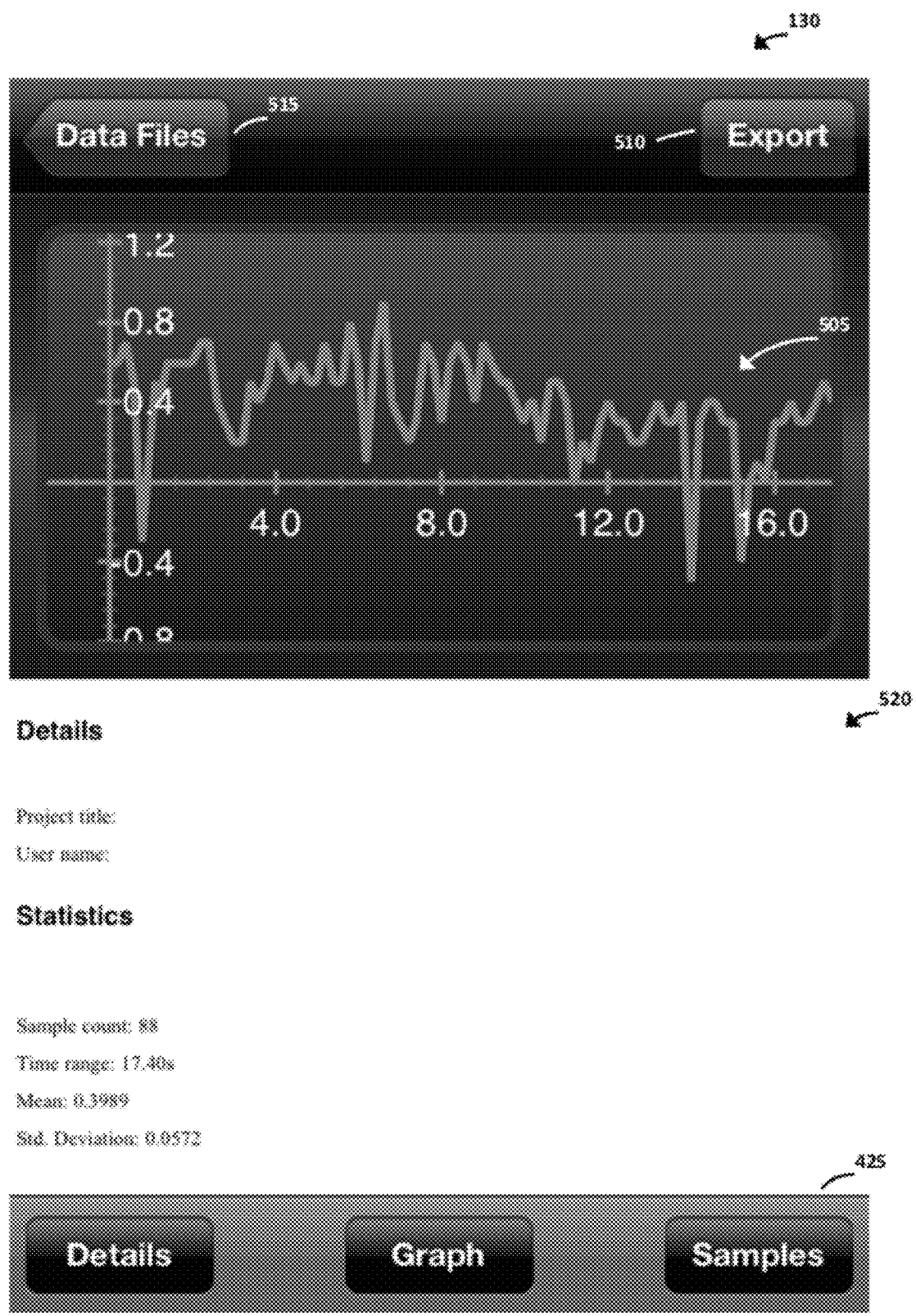
FIG. 5 illustrates exemplary images that may be projected on the display unit.

The receiving device 110 may be configured to project a variety of images and data representations on the display unit 130. As described above, the command bar 425 may comprise a graphing mode. FIG. 5 illustrates exemplary images that may be projected on the display unit 130 when the graphing mode is selected. The images may comprise a graph 505 of data measured by the measurement device 105 over a period of time. The graph 505 in FIG. 5 presents voltage measurements taken over a period of time of approximately 17 seconds. Various embodiments may be configured to project a variety of graphs which may be user customizable or preprogrammed.

In addition to the command bar 425 and the graph 505, additional details of the measurement may be displayed in an information pane 520. These details may comprise, for example, the user's name, a project name, number of data points, and statistical information related to the data points. Additional functionality may also be displayed, such as export key 510 which may allow measurement data to be downloaded to another device, such as through a Bluetooth or Internet connection, and a data files key 515 to access or store data. The functionality and features illustrated in FIGS. 4 and 5 are intended to be exemplary and are not to be construed as limiting in any manner. A wide variety of functionality and features as is known in the art may be associated with various embodiments.

The multimeter (or other device) functionality illustrated in FIGS. 4 and 5 may be implemented by a software or firmware application. The application may be installed and executed on a mobile computing device such as a smartphone or tablet computer. In various embodiments, the application may be downloaded from an "application store" accessible over the Internet, or downloaded over a network. Additionally, the application may be installed from removable storage media such as a flash drive, memory card, or the like.

The application may be written in a variety of programming languages known in the art, and may include sufficient encoding to operate in conjunction with an operating system of the receiving device 110 on which the application is stored. The application may take advantage of the functionality of the operating system to allow interfacing with various hardware components of the receiving device 110, such as wireless connectivity. Launching the application may cause the receiving device 110, in conjunction with resident hardware components of the receiving device 110, may cause the receiving device 110 to establish a wireless connection with the measurement device 105. Data from the measurement device 105 may be wirelessly transmitted to the receiving device 110. The application may obtain the transmitted data and permit the user to share, manipulate, and analyze the data.

Figure 6:
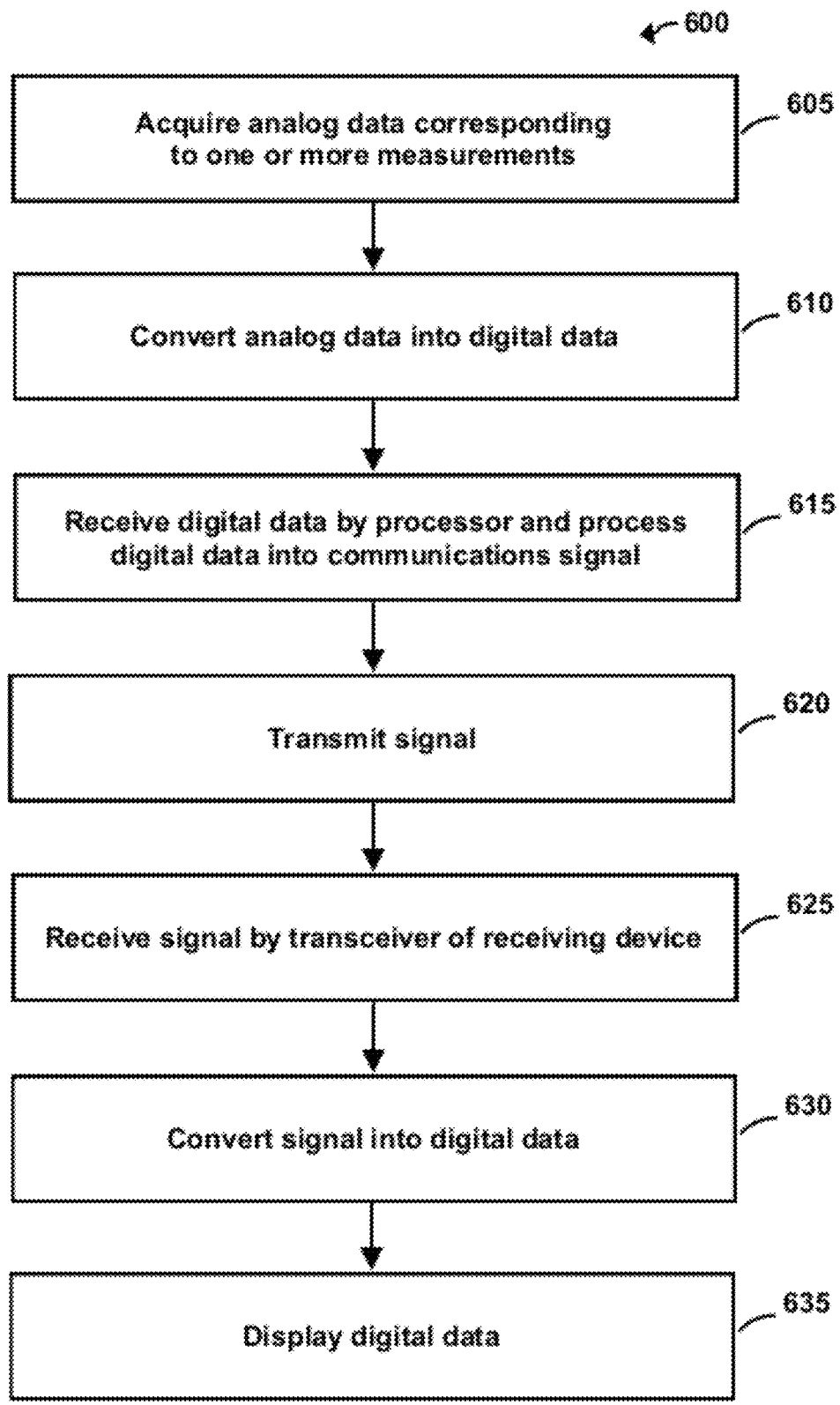
FIG. 6 is a flow diagram of a method for operating a measurement system.

In FIG. 6, various embodiments of a method of the present disclosure are exemplified by method 600. At step 605, data corresponding to one or more measurements may be acquired by a data acquisition component 125 of a measurement device 105. The data acquisition component 125 may comprise an analog-to-digital converter that is operative to convert any analog component of the data to digital data (step 610). The digital data may then be received by a processor 120 of the measurement device 105 which may convert the digital data into a communications signal (step 615). The measurement device 105 may further comprise a communications component 115 operative to transmit the communications signal (step 620) to a receiving device 110. In various embodiments, the communications component 115 may comprise a WiFi 802.11 module with an on-board IP stack that may allow the measurement device 105 to establish itself as a WiFi access point (hot-spot). The receiving device 110 may connect to the measurement device 105 via a traditional ad-hoc WiFi pairing (direct device-to-device connection), eliminating the need for a network connection.

The communications component 115 may be configured to establish an Internet network connection to allow communications between the measurement device 105 and the receiving device 110, particularly when the devices 105, 110 are out of range of the WiFi connection. Various embodiments may instead rely on other communication methods, such as Bluetooth, Zigbee, Wimax, infrared, and the like. Various embodiments may comprise a single communications method, while other embodiments may comprise more than one method. Selection of which communications method to use may occur automatically or may be selected by a user.

At step 625, a transceiver 140 of the receiving device 110 may receive the communications signal transmitted by the communications component 115. In various embodiments, the measurement device 105 and the receiving device 110 are separate devices and may be located remotely from one another. For example, it may be necessary to measure the amperage of the current drawn by a motor under varying process conditions. The measurement device 105 may be positioned at the motor in order to contact electrical connectors on the motor. A user may be positioned at a control panel for the process that is located a distance away from the motor. The user may hold the receiving device 110 while adjusting the process controls and observe on a display unit 130 of the receiving device 110 how the amperage varies. This may allow a single user to both make the process adjustments and observe the amperage changes, rather than having one user to operate the measurement device 105 and a second user to make the process changes.

A second processor 135 of the receiving device 110 may convert the signal into digital data (step 630). The digital data may be displayed on the display unit 130 of the receiving device 110 (step 635). The display unit 130 may display the data in a variety of forms. For example, the data may be displayed as a numerical value or may be displayed as a graphical representation of the variation of the measured value over a period of time.

Figure 7:
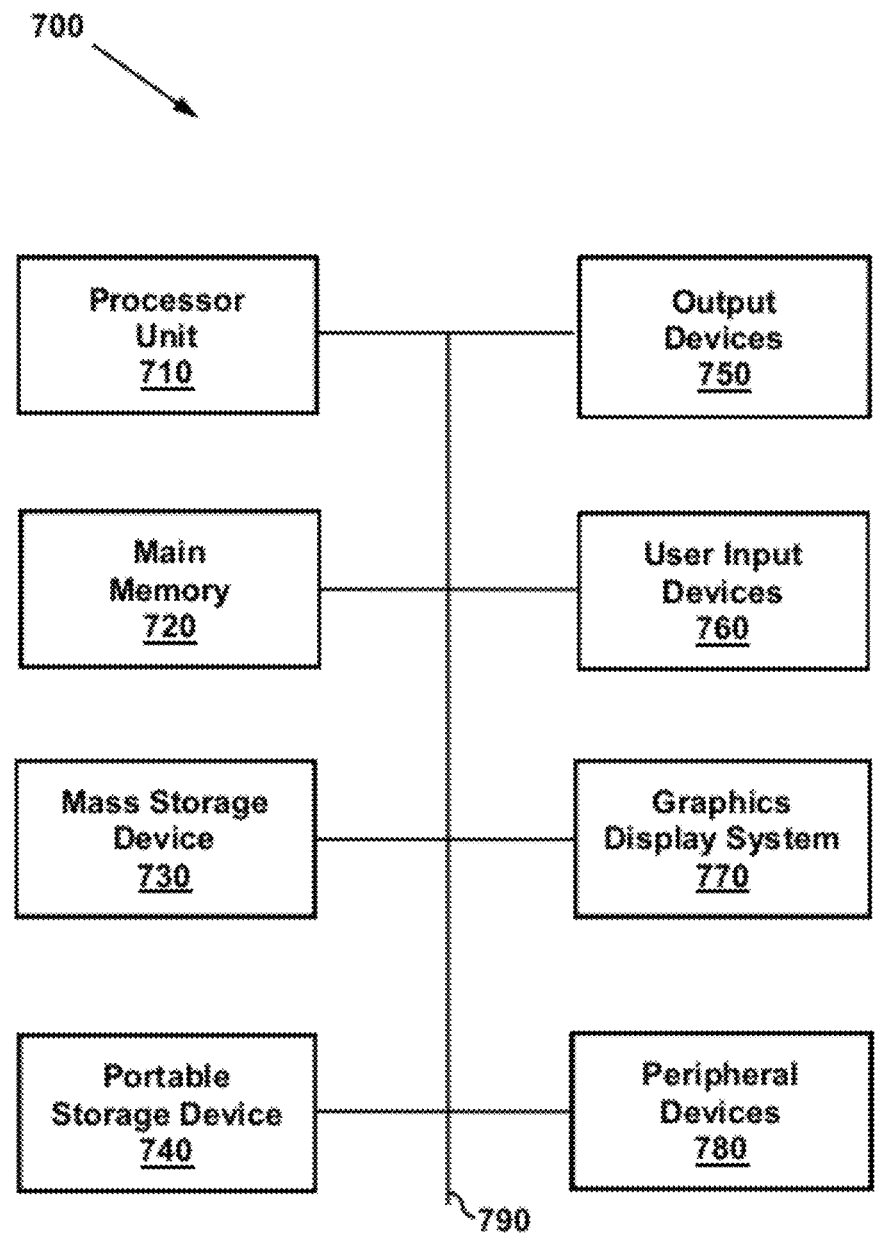
FIG. 7 is a block diagram of an exemplary computing system that may be utilized to practice aspects of the present disclosure.

FIG. 7 illustrates an exemplary computing system 700 that may be used to implement an embodiment of the present technology. The computing system 700 includes one or more processor units 710 and main memory 720. Main memory 720 stores, in part, instructions and data for execution by processor 710. Main memory 720 can store the executable code when the system 700 is in operation. The system 700 of FIG. 7 may further include a mass storage device 730, portable storage device(s) 740, output devices 750, user input devices 760, a graphics display system 770, and other peripheral devices 780.

The components shown in FIG. 7 are depicted as being connected via a single bus 790. The components may be connected through one or more data transport means. Processor unit 710 and main memory 720 may be connected via a local microprocessor bus, and the mass storage device 730, peripheral device(s) 780, portable storage device(s) 740, and graphics display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present technology for purposes of loading that software into main memory 720.

Portable storage device 740 operates in conjunction with a portable non-volatile storage media, such as a floppy disk, compact disk or digital video disc, to input and output data and code to and from the computer system 700 of FIG. 7. The system software for implementing embodiments of the present technology may be stored on such a portable media and input to the computer system 700 via the portable storage device 740.

User input devices 760 provide a portion of a user interface. User input devices 760 may include an alphanumeric keypad, such as a keyboard, for inputting alphanumeric and other information, or a pointing device, such as a mouse, a trackball, stylus, or cursor direction keys. Additionally, the system 700 as shown in FIG. 7 includes output devices 750. Suitable output devices include speakers, printers, network interfaces, and monitors.

Graphics display system 770 may include a liquid crystal display (LCD) or other suitable display device. Graphics display system 770 receives textual and graphical information, and processes the information for output to the display device.

Peripheral devices 780 may include any type of computer support device to add additional functionality to the computer system. Peripheral device(s) 780 may include a modem or a router.

The components contained in the computer system 700 of FIG. 7 are those typically found in computer systems that may be suitable for use with embodiments of the present technology and are intended to represent a broad category of such computer components that are well known in the art. Thus, the computer system 700 of FIG. 7 can be a personal computer, hand held computing system, telephone, mobile computing system, workstation, server, minicomputer, mainframe computer, or any other computing system. The computer may also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable media). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media. In various embodiments, the instructions may be implemented on the measurement device 105, the receiving device 110, or both. Various embodiments may also comprise instructions stored on a computer or server remote from the measurement device 105 or receiving device 110, accessible through a local area network, wide area network, wired or wireless connection, or other connection method known in the art.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic media, a CD-ROM disk, digital video disk (DVD), any other optical media, any other physical media with patterns of marks or holes, a RAM, a PROM, an EPROM, an EEPROM, a FLASHEPROM, any other memory chip or data exchange adapter, a carrier wave, or any other media from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

According to some embodiments, the computer system 700 may include a cloud-based computing environment that collects, processes, analyzes, and publishes datasets. In general, a cloud-based computing environment is a resource that typically combines the computational power of a large grouping of processors and/or that combines the storage capacity of a large group of computer memories or storage devices. For example, systems that provide a cloud resource may be utilized exclusively by their owners, such as Google™ or Yahoo!™, or such systems may be accessible to outside users who deploy applications within the computing infrastructure to obtain the benefits of large computational or storage resources.

The cloud may be formed, for example, by a network of web servers with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend upon the type of business associated with each user.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A control device for remotely controlling a measurement device, comprising:
    a graphical user interface to process commands from a user;
    a processor to convert the commands into a signal; and
    a transceiver that wirelessly transmits the signal to the measurement device and receives a return signal from the measurement device, wherein the signal directs the measurement device to measure one or more electrical characteristic parameters external to the measurement device and the return signal comprises data corresponding to the one or more measured electrical characteristic parameters.

2. The control device of claim 1, further comprising memory to store the data corresponding to the one or more measured electrical characteristic parameters.

3. The control device of claim 1, wherein the processor analyzes the data and provides a graphical representation of the data.

4. A measurement system, comprising:
    a control device, comprising:
        at least one memory;
        a first processor operatively coupled to the memory to produce command signals;
        a display unit coupled to the processor for displaying data; and
        a first transceiver for transmitting the command signals; and
    a measurement device that is remote from the control device, comprising:
        a second transceiver within the measurement device for receiving the command signals; and
        a second processor within the measurement device that processes the command signals and adjusts operation of the measurement device according to instructions in the command signals.

5. The measurement system of claim 4, wherein the control device further comprises a graphical user interface for projection on the display unit, the interface processing commands for operation of the measurement device.

6. The measurement system of claim 4, wherein the measurement device further comprises a data acquisition component coupled to the second processor, the data acquisition component comprising one or more sensors to detect an input voltage corresponding to one or more measured electrical characteristic parameters.

7. The measurement system of claim 6, wherein the one or more sensors comprise one or more probes that contact a portion of an electrical circuit and generate the input voltage.

8. The measurement system of claim 6, wherein one of the first and second processors is configured to convert the input voltage into a numerical representation of the one or more measured electrical characteristic parameters.

* * * * *